(No Model.) 2 Sheets—Sheet 1.
R. FITZGERALD.
FLUID PRESSURE BRAKE.
No. 582,816. Patented May 18, 1897.
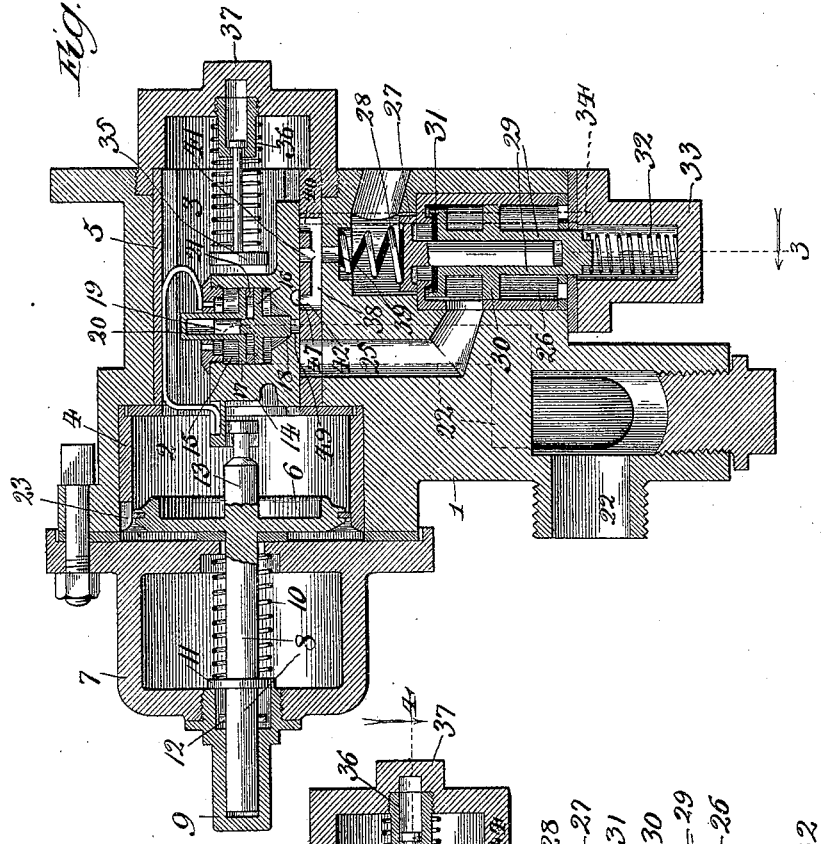
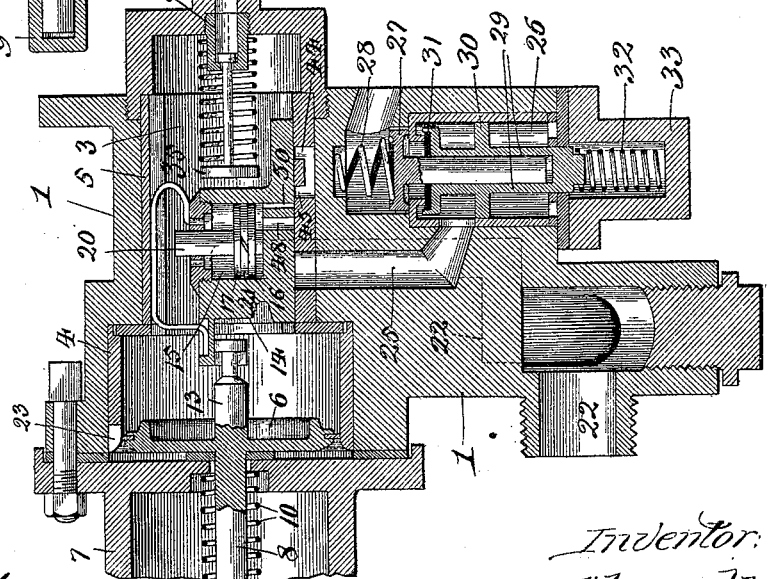
Witnesses:
Inventor:
Richard Fitzgerald,
By Samuel E. Hibben,
Att'y

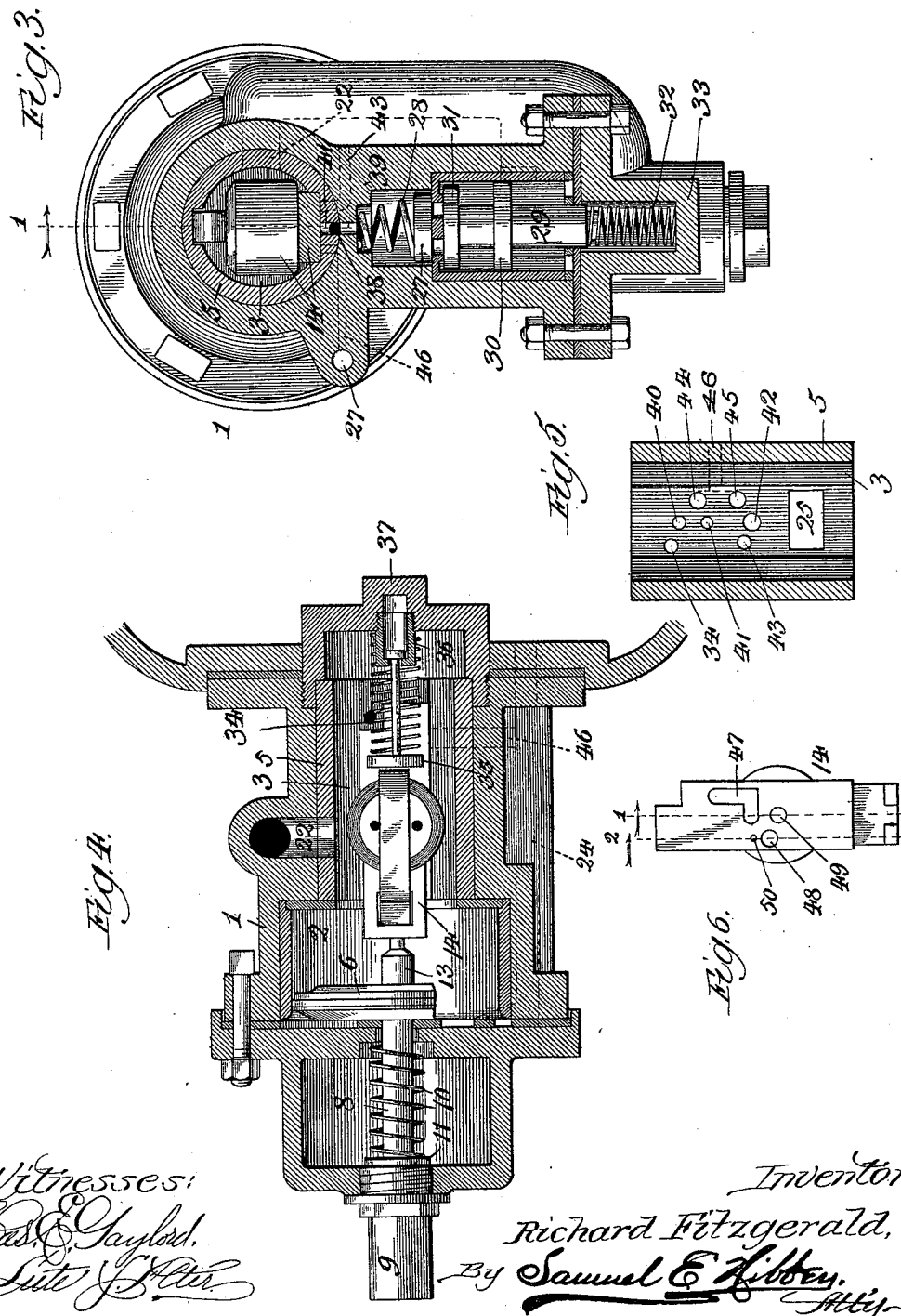

UNITED STATES PATENT OFFICE.

RICHARD FITZGERALD, OF CHICAGO, ILLINOIS.

FLUID-PRESSURE BRAKE.

SPECIFICATION forming part of Letters Patent No. 582,816, dated May 18, 1897.

Application filed February 1, 1897. Serial No. 621,452. (No model.)

*To all whom it may concern:*

Be it known that I, RICHARD FITZGERALD, residing at Chicago, Cook county, Illinois, have invented a new and useful Fluid-Pressure Brake, of which the following is a specification.

My invention relates to fluid-pressure brakes, and one of the main objects of the same is to provide means for feeding auxiliary-reservoir air back to the train-pipe to compensate for the loss of pressure therein caused by leaks in the hose-coupling, pipes, and otherwise when the engine is detached and thereby maintain an equalization between the auxiliary reservoir and the train-pipe to prevent the application of the brakes.

Another object of my invention is to provide for the slow passage of air from the brake-cylinder and reservoir back to the train-pipe after an emergency action, so that such brake-cylinder and reservoir-air may be utilized to assist the locomotive in restoring the train-pipe pressure.

In the drawings, Figure 1 is a sectional view taken on line 1 of Figs. 3 and 6, showing a triple valve embodying my invention; Fig. 2, a similar view taken on line 2 of Fig. 6; Figs. 3 and 4, sections taken on lines 3 and 4 of Figs. 1 and 2, respectively; Fig. 5, a view of the bushing forming a seat for the slide-valve, and Fig. 6 a face view of the slide-valve.

For the purpose of clearly describing and illustrating my invention I have selected the form of triple valve shown in the drawings and have incorporated my invention therewith without any intention of limiting myself to any particular form or operation of valve.

The valve-casing 1 has two interior chambers 2 and 3 with bushings 4 and 5 therefor, respectively. The chamber 2 is of the greater diameter and forms a cylinder in which the main piston 6 travels. A second casing 7 is bolted or otherwise secured to casing 1, the outer stem 8 of the main piston extending therein. This stem also projects into an end plug 9, which screws into casing 7 and acts as a guide for the stem. A spiral spring 10 surrounds the stem and abuts against a ring 11 and acts as a resisting-spring for the stem and piston in emergency action. A pin 12 is provided on the stem in such position thereon that the stem has a limited movement for service work before it abuts the ring to cause compression of the spring in emergency action.

The inner stem 13 of the piston is detachably connected to a slide-valve 14, controlling ports and passages opening upon bushing 4 and leading from the triple-valve chamber to the brake-cylinder and also controlling the exhaust-port. A chamber 15 is formed in the slide-valve, and a suitable cap closes one end except for openings therein for the passage of air from the chamber 3 to within the chamber 15. Traveling in this chamber is a piston having two stems and formed of two heads 16 and 17, the former having an inner stem 18 and an outer stem 19, the latter of which extends into the hollow stem 20. The inner stem constitutes a valve for controlling a port for admission of reservoir-air to the brake-cylinder in service applications of the brakes. Interposed between the two heads is a preferably metallic packing-ring 21, the construction of the same and also the heads being such as to permit the leakage of air under certain conditions.

The passage 22 is connected with the train-pipe and enters directly into chambers 3 and 2, which constitute the triple-valve chamber, which is thereby in constant communication with the train-pipe. A by-port 23 permits train-pipe air to pass through passage 24 to the auxiliary reservoir.

The emergency passage 25 leads from the triple-valve chamber through a chamber 26 direct to the brake-cylinder. Between chamber 26 and the brake-cylinder a non-return valve 27 is arranged and normally held seated by a spring 28.

Within chamber 26 is provided a balancing-valve which comprises a stem 29, having along its length a piston-head 30 and at its end a valve 31, normally held seated by a spring 32 in a hollow cap 33, into which extends a passage 34, opening upon the bushing 5 in the triple-valve chamber and uninterrupted by the slide-valve in running position. Train-pipe air is then fed behind piston 30, which is not fitted air-tight, but permits the air to pass to the emergency passage 25 and press with force equal to that upon the opposing face.

I prefer to provide a flexible resisting device for the slide-valve, and for this purpose I use a spring-pressed plunger 35, which travels in a hollow stem 36, screwing into the cap 37. This plunger is adapted to contact the enlarged portion of the slide-valve. This spring device, however, may be entirely dispensed with, if desired.

The bushing 5 has a passage 38 connecting with the brake-cylinder by a passage 39 and communicating with ports 40, 41, and 42, opening upon the face of the bushing. Port 43 is the exhaust-port and leads to the atmosphere. Port 44 and a communicating port 45 connect with a branch passage 46 from the auxiliary-reservoir supply-passage 24.

The slide-valve is provided with a recess or cavity 47 for releasing purposes and with three passages 48, 49, and 50, all of which enter the slide-valve chamber. The port 48 is the inlet for reservoir-air into the service-valve chamber, while port 49 is the outlet therefrom and is governed by the stem 18, which constitutes the service-valve of the device. The passage 50 is quite small in diameter and is located in alinement with port 48, but slightly above it.

The operation of my valve is as follows: Air enters the triple-valve chamber from the train-pipe, forcing piston 6 to the left, Fig. 1, and passes to the auxiliary reservoir through by-port 23 and passage 24. Air also passes through port and passage 34 behind the balancing-valve, and leaking past the piston thereof it enters the emergency passage 25. The air also enters the outer portion of chamber 15 and forces the service-valve to its seat to close port 49.

Upon a reduction of train-pipe pressure for service action the slide-valve is moved by the piston, closing the brake-release and connecting ports 44 and 48. Air will thereupon pass from the reservoir into chamber 15, forcing the service-valve 18 from its seat and permitting the air to pass from port 49 through ports and passages 42, 38, and 39 to the brake-cylinder. When the reservoir-air has been reduced sufficiently, the train-pipe air will seat valve 18 and retain the pressure in the brake-cylinder. Upon a restoration of train-pipe pressure the main piston is moved to running position, carrying the slide-valve. The recess 47 thereupon connects ports 42 and 43 to release the brakes, the reservoir being charged as before.

Upon a reduction of train-pipe pressure for emergency action the slide-valve makes a full travel against the tension of the spring 10 and plunger 35. The slide-valve moves beyond the emergency passage 25, and train-pipe air is vented through the triple-valve chamber direct to the brake-cylinder, the air behind the balancing-valve having been vented to the brake-cylinder by reason of the connection of ports 34 and 40 by the recess 47. The reservoir-air passes through ports and passages 45, 48, 49, and 41 to the brake-cylinder and augments the pressure therein.

By reason of the peculiar construction of the service-valve and the fact that it is not air-tight the air in emergency action will feed back slowly from the brake-cylinder, passing around the service-valve into the triple-valve chamber and thence into the train-pipe, whereby a portion at least of the pressure of the brake-cylinder is utilized after an emergency action in assisting the locomotive to restore the train-pipe pressure to release the brakes.

In the event of the parting or bursting of the hose-coupling of the train and the consequent emptying of the train-pipe and setting of the brakes for emergency it is now the practice to bleed the reservoirs on the rear part of the train behind the parted coupling and to close the cock on the rear car of the front part of the train in order to release the brakes. It is now necessary for the locomotive to pump up and restore the pressure in the train-pipe to release the brakes in the forward part of the train and after coupling to charge the reservoirs on the entire train, which operation consumes considerable time.

In my invention when the brakes are set for emergency accidentally, as above stated, by the parting of the hose-pipe it is unnecessary to bleed the reservoirs on the rear detached section, but simply to close the cock on the front end of that section. The air in the brake-cylinders and auxiliary reservoirs will slowly pass the service-valve to the train-pipe and refill the same. The cock on the rear end of the front part of the train having been closed the brakes are pumped off by the locomotive, whereupon that section is backed to the rear section. The reservoirs and brake-cylinders having filled the train-pipe of the rear section and caused equalization between the train-pipe, brake-cylinder, and auxiliary reservoir, the train-pipe is coupled up to pump off the brakes, and the train can proceed promptly with all the brakes in working order.

It is well known that when the locomotive is detached and there are any leaks in the train-pipe or hose-couplings the consequent reduction of pressure in the train-pipe will cause an application of the brakes, requiring a pumping up or bleeding before the train can proceed. This difficulty is avoided in my construction.

In event of any leakage under the above conditions the main piston of my triple valve travels slightly and moves the slide-valve a distance short of that necessary for service action and brings the small port and passage 50 to connect with port 44, but not to close the brake-release. Air slowly enters the service-valve chamber, and as there is a substantially equable pressure on both sides of the piston therein the metallic packing-ring is not compressed by the two-part piston-head, but air is permitted to pass the piston and ring into the train-pipe. Air is thus fed into the train-pipe at a rate to compensate for the loss by leakage and to maintain an equalization between the train-pipe and reservoir, and the brakes will therefore not be applied. When the slide-valve has made this slight travel, it will abut the spring-pressed plunger 35, which may be useful to prevent any possibility of a service action except when demanded by the engineer.

By the use of my invention I am enabled, preferably by means connected with the slide-valve, to automatically maintain an equalization of pressure between the train-pipe and reservoir when the locomotive is detached or between the former and the brake-cylinder and reservoir after emergency action. In the latter case the pressure after performing its function in applying the brakes is utilized to fill the train-pipe instead of being released. In the former case the said equalization is maintained, and all the air might flow from all the reservoirs to the train-pipe and out through the leaks without causing application of the brakes.

I claim—

1. In a brake mechanism, the combination with a brake-cylinder, auxiliary reservoir and train-pipe, of a triple valve for controlling pressure and means in the valve for permitting air to flow from the auxiliary reservoir to the train-pipe upon slight movement of the valve caused by reduction of train-pipe pressure.

2. In a brake mechanism, the combination with a brake-cylinder, auxiliary reservoir and train-pipe, of a triple-valve device having a slide-valve and a passage in the slide-valve for permitting a flow of air from the auxiliary reservoir to the train-pipe when the slide-valve travels a slight distance by reason of a slight reduction in train-pipe pressure, such distance traveled being less than that required for service action.

3. In a brake mechanism, the combination of a brake-cylinder, auxiliary reservoir and train-pipe, a triple-valve device having a slide-valve by whose slight initial travel caused by reduction of train-pipe pressure air is permitted to flow from the auxiliary reservoir to the train-pipe to maintain an equalization of pressure.

4. In a brake mechanism, the combination of a brake-cylinder, an auxiliary reservoir, a train-pipe, a triple valve whose chamber is in direct communication with the train-pipe, a slide-valve movable in such chamber and having a small restricted passage through which air slowly flows, upon a slight movement of the slide-valve, from the auxiliary reservoir through the slide-valve to the triple-valve chamber and train-pipe.

5. In a brake mechanism, the combination of a brake-cylinder, an auxiliary reservoir, a train-pipe, a triple-valve device having a slide-valve, the slide-valve having an interior chamber, a service-valve therein for controlling reservoir-air to the brake-cylinder, and a small restricted passage located in the slide-valve and entering the service-valve chamber, a slight travel of the slide-valve, short of that required for service action, connecting such passage with the auxiliary reservoir to maintain equalization of pressure in the latter and in the train-pipe.

6. In a brake mechanism, a triple valve having a service-valve forming a connection between the auxiliary reservoir and train-pipe upon a slight movement of the valve caused by reduction of train-pipe pressure.

7. In brake mechanism, a triple valve having its interior chamber in direct connection with the train-pipe, a piston-actuated slide-valve therein, a piston-actuated service-valve within the slide-valve, the service-valve piston not being fitted air-tight, a small passage through the slide-valve entering the service-valve chamber, a slight movement of the slide-valve connecting said passage with the auxiliary reservoir and permitting reservoir-pressure to pass slowly into the service-valve chamber and thence into the triple-valve chamber and train-pipe.

8. In brake mechanism, a triple valve having a piston-actuated slide-valve, and means upon the slide-valve for permitting, in emergency action, a slow backflow of pressure from the brake-cylinder and reservoir to the train-pipe.

9. In brake mechanism, a triple valve having a piston-actuated slide-valve, and a small passage in the slide-valve for permitting a restricted flow of air in emergency action from the brake-cylinder and auxiliary reservoir to the train-pipe through the slide-valve.

10. In brake mechanism a triple valve having a piston-actuated slide-valve, a service-valve in a chamber in the slide-valve, a restricted passage in the slide-valve for permitting a flow of pressure from the auxiliary reservoir through the service-valve chamber to the train-pipe when the slide-valve has made a slight travel less than that required for service action, and an emergency passage from the auxiliary reservoir through the service-valve chamber to the brake-cylinder, the service-valve device permitting leakage whereby after emergency application of the brakes the pressure may equalize through the service-valve chamber into the train-pipe.

11. In brake mechanism, a triple valve having a slide-valve which by a slight travel less than that for service action permits reservoir-air to flow to the train-pipe and which after its travel for emergency action and after the application of the brakes permits reservoir-air and brake-cylinder air to flow slowly into the train-pipe.

12. In a brake mechanism, the combination of a brake-cylinder, an auxiliary reservoir, a train-pipe, a triple-valve device having a slide-valve and means in the slide-valve for permitting a flow of air from the auxiliary reservoir to the train-pipe upon a slight travel of the slide-valve whereby an equalization of pressure is maintained between the auxiliary reservoir and train-pipe and the application of the brakes prevented in case of train-pipe leakage.

RICHARD FITZGERALD.

Witnesses:
H. K. HIBBEN,
SAMUEL E. HIBBEN.